United States Patent
Chen et al.

(10) Patent No.: US 12,517,863 B2
(45) Date of Patent: Jan. 6, 2026

(54) APPLICATION LOG CODING METHOD AND DEVICE AND COMPUTER READABLE STORAGE MEDIUM

(71) Applicant: CHINA UNIONPAY CO., LTD., Shanghai (CN)

(72) Inventors: Lin Chen, Shanghai (CN); Haiyang Zhang, Shanghai (CN); Sen Yang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 28 days.

(21) Appl. No.: 18/682,525

(22) PCT Filed: Jan. 28, 2022

(86) PCT No.: PCT/CN2022/074661
§ 371 (c)(1),
(2) Date: Feb. 9, 2024

(87) PCT Pub. No.: WO2023/015853
PCT Pub. Date: Feb. 16, 2023

(65) Prior Publication Data
US 2024/0362181 A1    Oct. 31, 2024

(30) Foreign Application Priority Data
Aug. 11, 2021   (CN) .......................... 202110919923.7

(51) Int. Cl.
*G06F 16/00* (2019.01)
*G06F 16/11* (2019.01)
*G06F 16/18* (2019.01)

(52) U.S. Cl.
CPC ........ *G06F 16/116* (2019.01); *G06F 16/1805* (2019.01)

(58) Field of Classification Search
CPC .......................... G06F 16/116; G06F 16/1805
See application file for complete search history.

(56) References Cited

U.S. PATENT DOCUMENTS

| | | | | |
|---|---|---|---|---|
| 8,661,425 B1* | 2/2014 | Polyudov | ............. | G06F 8/4436 717/165 |
| 11,113,159 B2* | 9/2021 | Zhang | .................... | G06F 12/16 |

(Continued)

FOREIGN PATENT DOCUMENTS

| | | |
|---|---|---|
| CN | 110727646 A | 1/2020 |
| CN | 111651784 A | 9/2020 |

(Continued)

OTHER PUBLICATIONS

Chinese Patent Application No. 202110919923.7, First Office Action, issued Jan. 21, 2024.

(Continued)

*Primary Examiner* — Noosha Arjomandi
(74) *Attorney, Agent, or Firm* — MARSHALL, GERSTEIN & BORUN LLP

(57) ABSTRACT

The present disclosure provides an application log coding output method, a device, a system, and a computer readable storage medium. The method comprises: loading a conversion appender using an extension mechanism of a native logger, loading a log converter and a native appender for outputting a log message using the conversion appender, the log converter comprising one or more log sub-converters, and loading the log sub-converters specified by an initialization parameter using the log converter; receiving the log message sent by the native logger using the conversion appender, scheduling the log sub-converters specified by the initialization parameter to execute log coding, and sending the processed log to the native appender for secure output. By using the method, diversified log coding output can be (Continued)

achieved without retrofitting an application, and the method is more friendly to developers.

10 Claims, 2 Drawing Sheets

(56) References Cited

U.S. PATENT DOCUMENTS

| | | | | |
|---|---|---|---|---|
| 11,120,011 | B2* | 9/2021 | Priebe | G06F 21/57 |
| 12,174,984 | B2* | 12/2024 | Daly | G06F 21/6218 |
| 2005/0138483 | A1* | 6/2005 | Hatonen | G06F 21/552 |
| | | | | 714/45 |
| 2016/0077855 | A1* | 3/2016 | Zu | G06F 9/45533 |
| | | | | 718/1 |
| 2017/0344560 | A1* | 11/2017 | Talur | G06F 16/182 |
| 2017/0351511 | A1* | 12/2017 | Bar-Or | G06F 8/34 |
| 2021/0258146 | A1* | 8/2021 | Castellucci | H04L 9/3297 |
| 2021/0342785 | A1* | 11/2021 | Mann | G06Q 10/06316 |
| 2023/0006814 | A1* | 1/2023 | Schuberg | G06F 16/18 |
| 2024/0061832 | A1* | 2/2024 | Hoang | G06F 40/284 |
| 2024/0119028 | A1* | 4/2024 | Kunz | G06F 16/116 |
| 2024/0296031 | A1* | 9/2024 | Schaffer | G06F 8/36 |
| 2024/0362181 | A1* | 10/2024 | Chen | G06F 17/40 |
| 2025/0077697 | A1* | 3/2025 | Daly | G06F 21/31 |

FOREIGN PATENT DOCUMENTS

| | | | | |
|---|---|---|---|---|
| CN | 111897497 | A | | 11/2020 |
| CN | 112306431 | A * | | 2/2021 |
| CN | 112307512 | A * | | 2/2021 |
| CN | 113704820 | A | | 11/2021 |
| CN | 117742783 | B * | | 6/2024 |
| CN | 118860357 | B * | | 2/2025 ............... G06F 8/31 |
| WO | WO-03081433 | A1 * | | 10/2003 .......... G06F 11/3466 |

OTHER PUBLICATIONS

International Application No. PCT/CN2022/074661, International Search Report, mailed Apr. 8, 2022.

* cited by examiner

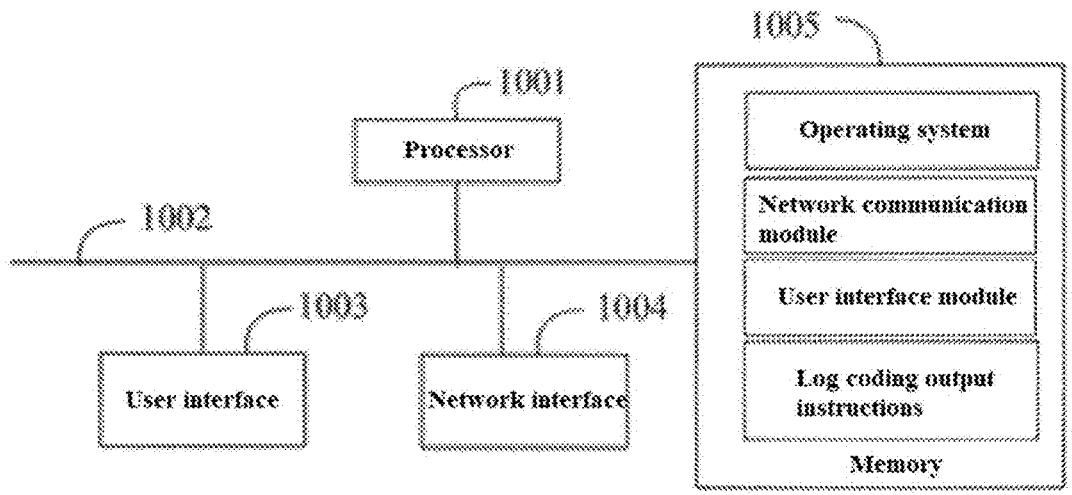

Loading a conversion appender using an extension mechanism of a native logger, loading a log converter and a native appender for outputting a log message using the conversion appender, loading the log sub-converters specified by an initialization parameter using the log converter — S201

Receiving a log message sent by the native logger using the conversion appender, scheduling the log sub-converters specified by the initialization parameter to execute log coding, and sending the processed log to the native appender for secure output — S202

Fig. 2

APPLICATION LOG CODING METHOD AND DEVICE AND COMPUTER READABLE STORAGE MEDIUM

CROSS-REFERENCE TO RELATED APPLICATIONS

The present application is a U.S. national stage of International Application No. PCT/CN2022/074661, filed Jan. 28, 2022, which claims priority to Chinese Patent Application No. 202110919923.7, titled "APPLICATION LOG CODING METHOD, DEVICE AND COMPUTER READABLE STORAGE MEDIUM", filed on Aug. 11, 2021, the disclosures of which are incorporated herein by reference in their entirety.

FIELD

The present disclosure relates to the field of logging, and in particular to an application log coding output method, device, and a computer readable storage medium.

BACKGROUND

This section intends to provide a background or context for the embodiments of the present disclosure as stated in the claims. The description herein is not recognized as conventional by virtue of its inclusion in this section.

A Java application involves input and output of raw text when it calls a conventional logging framework such as log4j. If the log content contains sensitive information, the sensitive information would be output into a console or log file. At this point, to realize coding output of the sensitive information, it is generally necessary to convert the log content containing the sensitive information in accordance with a fixed logic by various means before the application calls the logging framework to output logs, and then use the converted coded content as input to call the logging framework for output.

However, this implies the need for explicit, additional coding preprocessing each time before calling the logging framework to output the logs, which would lead to changes in the application's API for calling the logs, requiring the application retrofitting. Such a scheme would significantly change developers' programming habits, and may fail to achieve desired coding effects if the preprocessing is omitted due to negligence before calling certain log printing. In addition, it is not possible to process the logs output autonomously within certain third-party class libraries.

Therefore, log coding output applied to, for example, JAVA application logs is an urgent problem to be solved.

SUMMARY

An application log coding output method, a device, and a computer readable storage medium are provided for the problem stated above. By using the above method, device and computer readable storage medium, the above problem can be solved.

The present disclosure provides the following solutions.

According to an aspect of the present disclosure, there is provided an application log coding output method, comprising: loading a conversion appender using an extension mechanism of a native logger, loading a log converter and a native appender for outputting a log message using the conversion appender, the log converter comprising one or more log sub-converters, and loading the log sub-converters specified by an initialization parameter using the log converter; receiving the log message sent by the native logger using the conversion appender, scheduling the log sub-converters specified by the initialization parameter to execute log coding, and sending the processed log to the native appender for secure output.

In one embodiment, both the native logger and the native appender are native modules of a JAVA logging framework.

In one embodiment, the log converter comprises one or more of the following log sub-converters: a Regex converter, a Json converter, a Base64 converter and an ISO 8583 converter.

In one embodiment, loading the conversion appender using the extension mechanism of the native logger further comprises: the native logger loading the conversion appender based on configuration files, wherein the configuration files comprise: appender-type identifiers for one or more native appenders, log sub-converter-type identifiers for one or more log sub-converters, and conversion rules corresponding to one or more log sub-converters.

In one embodiment, the conversion rules corresponding to one or more log sub-converters comprise: a Regex conversion rule, for replacing parts of original log content satisfying Regex matching according to a preset replacement rule; a Json conversion rule, for specifying a field name and a replacement method of a Json object; and an ISO 8583 conversion rule, for specifying a domain number and a replacement method of a 8583 message object.

In one embodiment, the Json conversion rule and the ISO 8583 conversion rule nestedly schedules the Regex converter or the Base64 converter during conversion.

In one embodiment, the native appender comprises one or more of the following: a console appender, a file appender, a socket appender, and an SMTP mail appender.

In one embodiment, the conversion appender is compatible with any one or more of the following JAVA logging frameworks: slf4j, log4j, log4j2, logback and common-logging.

According to another aspect of the present disclosure, there is provided a log coding output device. The device is configured to perform the method according to the first aspect, and comprises: a native logger configured to load a conversion appender based on an extension mechanism; the conversion appender configured to load a log converter and a native appender for outputting a log message, the log converter comprising one or more log sub-converters; the log converter configured to load the log sub-converters specified by an initialization parameter; and the conversion appender configured to further receive the log message sent by the native logger, schedule the log sub-converters specified by the initialization parameter to execute log coding, and send the processed log to the native appender for secure output.

According to another aspect of the present disclosure, there is provided a log coding output device, comprising: at least one processor; and a memory communicatively connected to the at least one processor; wherein the memory stores instructions executable by the at least one processor, the instructions being executed by the at least one processor to enable the at least one processor to perform: the method according to the first aspect.

According to another aspect of the present disclosure, there is provided a computer readable storage medium, the computer readable storage medium stores a program that, when executed by a multicore processor, causes the multicore processor to perform the method according to the first aspect.

At least one of the above-mentioned technical solutions employed in the embodiments of the present disclosure can achieve the following beneficial effects: in this embodiment, a conversion appender for log coding is introduced between a native logger and a native appender, so that diversified log coding outputs can be achieved without retrofitting an application, which is more friendly to developers. In addition, one or more log sub-converters are provided for selection, which can be further accommodate diverse conversion needs.

It is to be understood that the foregoing description is only an overview of the technical solution of the present disclosure, so that the technical means of the present disclosure can be more clearly understood and thus can be implemented in accordance with the contents of the specification. To make the above and other objectives, features and advantages of the present disclosure more apparent and easier to understand, specific embodiments of the present disclosure are hereinafter illustrated by way of example.

BRIEF DESCRIPTION OF THE DRAWINGS

By reading the detailed description of the exemplary embodiments below, a person skilled in the art will understand the advantages and benefits of the present disclosure as well as other advantages and benefits. The drawings are for the purpose of illustrating exemplary embodiments only, and are not to be considered as a limitation to the present disclosure. Moreover, the same reference numerals refer to the same components throughout the drawings, wherein:

FIG. 1 is a structural diagram of an application log coding output device according to an embodiment of the present disclosure;

FIG. 2 is a flow diagram of an application log coding output method according to an embodiment of the present disclosure;

In the drawings, the same or corresponding reference numerals refer to the same or corresponding parts.

DETAILED DESCRIPTION OF EMBODIMENTS

Figure 3:
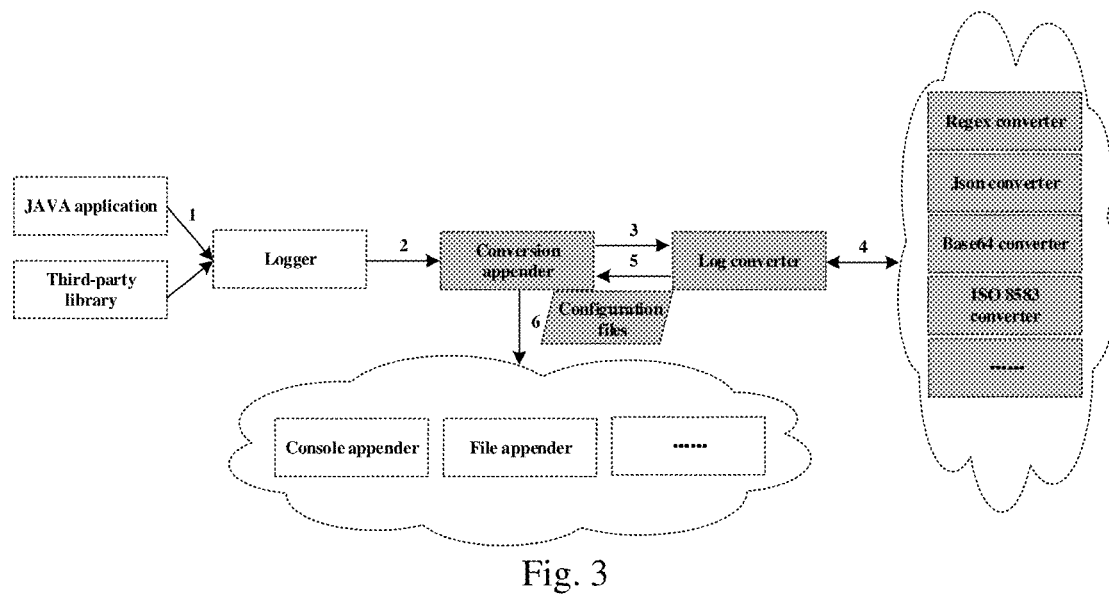
FIG. 3 is an implementation diagram of an application log coding output method according to an embodiment of the present disclosure.

The exemplary embodiments of the present disclosure will be described hereinafter in more detail with reference to the drawings. Although the drawings illustrate the exemplary embodiments of the present disclosure, it is to be understood that the present disclosure may be implemented in various forms and should not be restricted by the embodiments set forth herein. Rather, these embodiments are provided to enable a more thorough understanding of the present disclosure and to enable the complete communication of the scope of the present disclosure to a person skilled in the art.

In the description of the embodiments of the present disclosure, it is to be understood that terms such as "including" or "having" are intended to indicate the presence of the features, figures, steps, acts, components, parts or combinations thereof disclosed herein, and are not intended to exclude the possibility of the presence of one or more other features, figures, steps, acts, components, parts or combinations thereof.

Unless otherwise specified, "/" means "or". For example, A/B may mean either A or B. "And/or" in the present disclosure merely describes the associative relationship of associated objects, indicating that there may be three kinds of relationships. For example, A and/or B may represent the following three circumstances: A alone, both A and B, and B alone.

The terms such as "first" or "second" are for descriptive purpose only, and not to be construed as indicating or suggesting relative importance or implicitly specifying the number of the technical features indicated. Therefore, the features defined with "first", "second" and the like may expressly or impliedly include one or more such features. In the description of the embodiments of the present disclosure, unless otherwise specified, "a plurality of" means two or more.

All the codes in the present disclosure are exemplary. A person skilled in the art may conceive of variations thereof based on factors such as the programming language used, specific needs and personal habits, without departing from the spirit of the present disclosure.

To clearly describe the embodiments of the present disclosure, some concepts that may appear in subsequent embodiments will be first introduced.

Description of Concepts

API (Application Programming Interface) is a predefined interface, such as a function or an HTTP interface.

Logger, also known as the native logger, is a Java's native logging API.

Slf4j (Simple logging facade for Java) is a simple logging façade for Java, which provides a simple uniform interface for a logging API, enabling users to configure the implementation of the logging façade during deployment.

Log4j (Logging for Java) is an open-source Java logging component for controlling the log output destination, such as a console, a file, etc. . . . . Log4j2 is an upgraded version of log4j.

Logback is another logging component.

Common-logging is a generic logging with an open-source generic logging interface component and is compatible with lightweight and non-dependent specific logging implementation tools.

JSON (JavaScript Object Notation) is a lightweight data interaction format.

BASE64 refers to an encoding for representing binary data based on 64 printable characters.

ISO 8583 (International organization for standardization 8583 message) refers to an international standard message format that is widely used for bank cards.

It is also noted that the embodiments and the features in the embodiments of the present disclosure may be combined with each other, as long as they are not in conflict. The present disclosure will be described in detail hereinafter with reference to the drawings and in conjunction with embodiments.

As illustrated in FIG. 1, FIG. 1 is a structural diagram of a hardware operating environment involved in the embodiment scheme of the present disclosure.

It should be noted that FIG. 1 may be a structural diagram of a hardware operating environment of a log coding output device. The log coding output device in the embodiment of the present disclosure may be a terminal device such as a PC, a portable computer, and the like.

As illustrated in FIG. 1, the log coding output device may include: a processor 1001 such as a CPU, a network interface 1004, a user interface 1003, a memory 1005 and a communication bus 1002. Among them, the communication bus 1002 is used for connection and communication between these components. The user interface 1003 may include a display, and an input unit such as a keyboard. Optionally, the user interface 1003 may also include a standard wired interface, a wireless interface. The network interface 1004 may optionally include a standard wired interface, wireless interface (such as WI-FI interface). The memory 1005 may be a high-speed RAM memory, or a non-volatile memory such as a magnetic disc memory. The memory 1005 may also optionally be a storage device independent from the aforementioned processor 1001.

It may be appreciated by a person skilled in the art that the structure of the log coding output device as illustrated in FIG. 1 does not constitute a limitation to the log coding output device, and may include more or less components than those illustrated, or a combination of certain components, or different arrangements of components.

As illustrated in FIG. 1, the memory 1005 serving as a computer storage medium may include an operating system, a network communication module, a user interface module and log coding output instructions (program), wherein the operating system is a program that manages and controls hardware and software resources of the log coding output device, and supports the operation of the log coding output program and other software or program.

In the log coding output device illustrated in FIG. 1, the user interface 1003 is mainly used for transmitting requests, data and the like; the network interface 1004 is mainly used connecting a back-end server with a back-end server for data communication; the processor 1001 may be used for scheduling the log coding output program stored in the memory 1005, and perform the following operations:

Initialization step: loading a conversion appender using an extension mechanism of a native logger, loading a log converter and a native appender for outputting a log message using the conversion appender, the log converter comprising one or more log sub-converters, and loading the log sub-converters specified by an initialization parameter using the log converter;

Operating step: receiving the log message sent by the native logger using the conversion appender, scheduling the log sub-converters specified by the initialization parameter to execute log coding, and sending the processed log to the native appender for secure output.

By introducing a conversion appender between a native logger and a native appender, diversified log coding outputs can be achieved without retrofitting an application. Moreover, since the log conversion logic can be stripped from the business logic, it is easy to maintain the business code. In addition, one or more log sub-converters are provided for selection, which can be further accommodate diverse conversion needs.

FIG. 2 is a flow diagram of a log coding output method according to an embodiment of the present disclosure, for log coding output. In this diagram, the executing entity may be one or more electronic devices from a device perspective; the executing entity may correspondingly be programs loaded on these electronic devices from a program perspective.

As illustrated in FIG. 2, the method provided in the embodiment may include the following steps:

S201: loading a conversion appender using an extension mechanism of a native logger, loading a log converter and a native appender for outputting a log message using the conversion appender, loading the log sub-converters specified by an initialization parameter using the log converter, wherein the log converter comprises one or more log sub-converters.

The above S201 is an initialization step. To be specific, the initialization parameter is required to execute the above initialization, and the initialization parameter specifies the log sub-converters. Optionally, the initialization parameter may also specify the native appender.

In one example, a Regex converter is used as an example for illustration. The native logger is initialized to Logger.getLogger ("Regex converter identifier"), wherein Logger refers to a Java's native logger. The appender-ref ref= "Regex converter name" correspondingly configured for the native logger specifies a log sub-converter.

Optionally, it is possible to declare or initialize a plurality of different native loggers such as Logger 1 and Logger 2, and further correspond different native loggers to different log sub-converters, such as corresponding to a Regex converter and a BASE64 converter, respectively. In this way, programmers can specifically select the declared different native loggers according to the log content to be output, at positions where application codes intend to output logs, to fulfill log coding output.

In one embodiment, both the native logger and the native appender may be native modules of a JAVA logging framework.

In one embodiment, in S201, the native logger loads the conversion appender based on configuration files, the configuration files comprise: appender-type identifiers for one or more native appenders, log sub-converter-type identifiers for one or more log sub-converters, and conversion rules corresponding to one or more log sub-converters. The above native appenders and log sub-converters are included in the configuration files in the form of class names, and the conversion appender may load any one or more native appenders and log sub-converters as desired, based on the class names.

In one embodiment, the native appender comprises, but is not limited to, one or more of the following: a console appender, a file appender, a socket appender, an SMTP mail appender and the like. Of course, other native appenders may also be included, and they are not specifically defined in the present disclosure. As such, the logs can be output into a console or a file as needed.

In one example, the above console appender may be org.apache.log4j.ConsoleAppender and the like. In one embodiment, the conversion appender is compatible with any one or more of the following JAVA logging frameworks: slf4j, log4j, log4j2, logback and common-logging.

In one embodiment, the log converter comprises one or more of the following log sub-converters: a Regex converter, a Json converter, a Base64 converter and an ISO 8583 converter, thereby providing various types of coding conversion. Other log sub-converters may also be included, and they are not specifically defined in the present disclosure.

Further, except that the Base64 converter directly performs Base64 coding on the log content, the other sub-converters also rely on conversion rules in the configuration files for conversion. The conversion rules specifically include:

1. Regex conversion rule, for replacing the part of original log content satisfying Regex matching according to a preset replacement rule. For example, {\"regex\":\"^(\\\\d{6})\\\\d+(\\\\d{4})$\",\"replacement\": \"$1**$2\"} may support multiple rules for simultaneous configuration. This Regex conversion rule means filtering the received original log content and replacing the part of original log content satisfying Regex matching according to the replacement rule directed by "replacement". For example, "6228880000000008" may be converted to "622888****0008".

2. Json conversion rule, for specifying a field name and a replacement method of a Json object. The conversion configuration of the Json converter requires specifying the field name and the replacement method of the Json object. In practical implementations, the Regex conversion may be nested and scheduled (The Json conversion may also be achieved herein by scheduling the implemented Base64 conversion).

3. ISO 8583 conversion rule, for specifying a domain number and a replacement method of a 8583 message object. The conversion configuration of the ISO 8583 converter requires specifying the domain number and the replacement method of the 8583 message object. In practical implementations, the Regex conversion may be nested and scheduled.

In this embodiment, the purpose of specifying the field name of the Json object or the domain number of the ISO 8583 message object is to improve conversion efficiency, because the use of Regex conversion may theoretically achieve various coding scenarios, for example, for bank card strings, phone number strings, ID number strings, etc. . . . . . However, there is an efficiency problem of excessive coding caused by misjudgment or Regex filtering when dealing with extensive log content. Therefore, the present disclosure further provides the sub-converters for the Json object and the ISO 8583 object commonly seen in daily development processes.

S202: receiving a log message sent by the native logger using the conversion appender, scheduling the log sub-converters specified by the initialization parameter to execute log coding, and sending the processed log to the native appender for secure output.

The above S202 is a practical operating step for log coding output. In one example, referring to FIG. 3 which illustrates an implementation diagram of this embodiment, the arrows represent the logical relationship of the application log coding device of the present disclosure, The white blocks in FIG. 3 represent Java's native or third-party logging components, such as a JAVA application, a native logger, a console appender, a file appender, and so on. The grey blocks represent elements used for log coding in the present disclosure, including a conversion appender, a log converter and various log sub-converters (a Regex converter, a JSON converter, a Base64 converter and an ISO 8583 converter). A conversion appender is implemented by using an extension mechanism provided by each logging framework, and the conversion appender internally integrates the native appender and the log converter compatible with each logging framework. Wherein, 1. The native logger obtains a log message from a JAVA application. 2. The native logger schedules the conversion appender and sends the log message to the conversion appender. 3. The conversion appender schedules the log converter and sends the log content to the log converter. 4. The log converter schedules the log sub-converters to code or convert sensitive information in the log content using the log sub-converters. 5. The log converter sends the coded and converted log message back to the conversion appender. 6. The conversion appender sends the converted log message to the native appender of the logging framework to output the content, thereby ensuring output information security.

In a conventional JAVA application log output scheme, after obtaining a log message generated in the JAVA application, a native logger will directly output the log message by a console appender or a file appender. However, in the scheme of the present disclosure, by inserting the conversion appender and the like between the native logger and the native appender, it is possible to code and convert the log message sent from the native logger, and then output the coded and converted log message via the native appender. The entire process is insensitive to the JAVA application end.

The technical solution provided in this embodiment will be described in detail hereinafter in conjunction with pseudocode of application examples:

```
public class Main {
    static Logger logger1 = Logger.getLogger ("REGEX"); initialize
    "logger1 to REGEX"
    static Logger Logger2 = Logger.getLogger ("BASE64"); initialize
    "logger2 to BASE64"
    public static void main (String[ ] args) {
        logger1.info ("6228880000000008"); input logger 1 as
        "6228880000000008"
        logger2.info ("hello"); input logger2 as "hello"
    }
}
```

The output after executing the exemplary program of the embodiment of the present disclosure is:

>INFO Main-622888******0008

>INFO Main-aGVsbG8=

In other words, logger1/2 in the above example only needs to initialize the native logger, which can be repetitively used within its scope. Moreover, a plurality of different native loggers can be declared and initialized within the scope, so that programmers can specifically select the declared different native loggers according to the log content to be output, at positions where application codes intend to output logs, to fulfill log coding output. As such, the programming habits remain almost unchanged, and the log content to be output, formal parameters and the like remain unchanged as well. The name logger1/2 of the native logger per se is a temporary variable, and just needs to be remembered within its scope.

In the description of present disclosure, the reference terms such as "some possible implementations", "some embodiments", "examples", "specific examples" or "some examples" are intended to denote that specific features, structures, materials or characteristics described in conjunction with the embodiments or examples are included in at least one embodiment or example of the present disclosure. In the present disclosure, the illustrative descriptions of the above terms do not necessarily pertain to the same embodiment or example. Moreover, the specific features, structures, materials or characteristics described may be combined as appropriate in any one or more embodiments or examples. Furthermore, a person skilled in the art may combine different embodiments or examples described in the present disclosure as well as the features of different embodiments or examples, in the absence of contradiction.

In addition, the terms "first" and "second" are for descriptive purpose only, and not to be construed as indicating or suggesting relative importance or implicitly specifying the number of the technical features indicated. Therefore, the features defined with "first" and "second" may expressly or impliedly include at least one of these features. In the description of the present disclosure, "a plurality of" means at least two, such as two, three, etc., unless otherwise specified.

Any process or method described in the flow diagram or otherwise described herein may be understood as comprising one or more modules, segments or sections of codes of executable instructions for implementing specific logic functions or steps of the process. Moreover, it is to be understood by a person skilled in the field to which the embodiments of the present disclosure belong that, the scope of optional implementations of the present disclosure includes further implementations, wherein functions may be performed in a substantially simultaneous manner or in reverse order according to the functions involved, regardless of the order shown or discussed.

Regarding the method flow diagram according to the embodiments of the present disclosure, some operations are described as different steps performed in a certain order. Such a flow diagram is illustrative rather than restrictive. Some steps described herein may be grouped together and performed in a single operation, some steps may be divided into a plurality of sub-steps, and some steps may be performed in a different order than illustrated herein. The steps illustrated in the flow diagram may be implemented in any manner by any circuit structure and/or tangible mechanism (for example, software, hardware running on a computer device (for example, a processor or chip-implemented logic function) etc., and/or any combination thereof).

Based on the same technical conception, the embodiments of the present disclosure also provide a log coding output device, for executing the log coding output method according to any one of the above embodiments.

The device comprises: a native logger configured to load a conversion appender based on an extension mechanism; the conversion appender configured to load a log converter and a native appender for outputting a log message, the log converter comprising one or more log sub-converters; the log converter configured to load the log sub-converters specified by an initialization parameter; and the conversion appender configured to further receive the log message sent by the native logger, schedule the log sub-converters specified by the initialization parameter to execute log coding, and send the processed log to the native appender for secure output.

According to some embodiments of the present disclosure, there is provided a nonvolatile computer storage medium for a log coding output method, with computer executable instructions stored thereon. The computer executable instructions, when executed by a processor, are configured to perform: the method described in the above embodiments.

The embodiments of the present disclosure are described in a progressive manner, and the same and similar parts between the embodiments may be cross-referenced. What each embodiment emphasizes and focuses on makes it different from other embodiments. In particular, since the embodiments regarding the device, apparatus and computer readable storage medium are substantially similar to the method embodiments, they are simplified in description, and may refer to relevant description in the method embodiments.

The device, apparatus and computer readable storage medium provided in the embodiments of the present application have one-to-one correspondence with the method. Therefore, the device, apparatus and computer readable storage medium also have the beneficial technical effects similar to those of the corresponding method. The beneficial effects of the device, apparatus and computer readable storage medium will not be repeated here, as those of the method have been described in detail.

While the spirit and principles of the present disclosure have been described with reference to several specific embodiments, it is to be understood that the present disclosure is not limited to the specific embodiments disclosed herein. The division of various aspects also does not mean that the features in these aspects cannot be combined to deliver beneficial effects. Such division is just for the convenience of expression. The present disclosure is intended to cover various modifications and equivalent arrangements within the spirit and scope of the appended claims.

The invention claimed is:

1. An application log coding output method, comprising:
   loading a conversion appender using an extension mechanism of a native logger, loading a log converter and a native appender for outputting a log message using the conversion appender, the log converter comprising one or more log sub-converters, and loading the log sub-converters specified by an initialization parameter using the log converter;
   receiving the log message sent by the native logger using the conversion appender, scheduling the log sub-converters specified by the initialization parameter to execute log coding, and sending the processed log to the native appender for secure output, wherein loading the conversion appender using the extension mechanism of the native logger further comprises:
   the native logger loading the conversion appender based on configuration files:
   wherein the configuration files comprise: appender-type identifiers for one or more native appenders, log sub-converter-type identifiers for one or more log sub-converters, and conversion rules corresponding to one or more log sub-converters.

2. The method according to claim 1, wherein both the native logger and the native appender are native modules of a JAVA logging framework.

3. The method according to claim 1, wherein the log converter comprises one or more of the following log sub-converters: a Regex converter, a Json converter, a Base64 converter and an ISO 8583 converter.

4. The method according to claim 1, wherein the conversion rules corresponding to one or more log sub-converters comprise:
   a Regex conversion rule, for replacing parts of original log content satisfying Regex matching according to a preset replacement rule;
   a Json conversion rule, for specifying a field name and a replacement method of a Json object; and
   an ISO 8583 conversion rule, for specifying a domain number and a replacement method of a 8583 message object.

5. The method according to claim 4, wherein the Json conversion rule and the ISO 8583 conversion rule nestedly schedules the Regex converter or the Base64 converter during conversion.

6. The method according to claim 1, wherein the native appender comprises one or more of the following: a console appender, a file appender, a socket appender, and an SMTP mail appender.

7. The method according to claim 1, wherein the conversion appender is compatible with any one or more of the following JAVA logging frameworks: slf4j, log4j, log4j2, logback and common-logging.

8. A log coding output device configured to perform the method according to claim 1, comprising:
   a native logger configured to load a conversion appender based on an extension mechanism;

the conversion appender configured to load a log converter and a native appender for outputting a log message, the log converter comprising one or more log sub-converters;

the log converter configured to load the log sub-converters specified by an initialization parameter; and the conversion appender configured to further receive the log message sent by the native logger, schedule the log sub-converters specified by the initialization parameter to execute log coding, and send the processed log to the native appender for secure output.

9. A log coding output device, comprising:

at least one processor; and a memory communicatively connected to the at least one processor; wherein the memory stores instructions executable by the at least one processor, the instructions being executed by the at least one processor to enable the at least one processor to perform: the method according to claim 1.

10. A non-transitory computer readable storage medium, the computer readable storage medium stores a program that, when executed by a multicore processor, causes the multicore processor to perform the method according to claim 1.

* * * * *